(12) United States Patent
Tamma

(10) Patent No.: US 11,977,459 B2
(45) Date of Patent: May 7, 2024

(54) TECHNIQUES FOR ACCELERATED DATA RECOVERY

(71) Applicant: Rubrik, Inc., Palo Alto, CA (US)

(72) Inventor: Leela S. Tamma, San Ramon, CA (US)

(73) Assignee: Rubrik, Inc., Palo Alto, CA (US)

( * ) Notice: Subject to any disclaimer, the term of this patent is extended or adjusted under 35 U.S.C. 154(b) by 29 days.

(21) Appl. No.: 17/830,395

(22) Filed: Jun. 2, 2022

(65) Prior Publication Data

US 2023/0393951 A1    Dec. 7, 2023

(51) Int. Cl.
    *G06F 11/14*    (2006.01)
(52) U.S. Cl.
    CPC ...... *G06F 11/1469* (2013.01); *G06F 11/1451* (2013.01)
(58) Field of Classification Search
    CPC .......................... G06F 11/1469; G06F 11/1451
    See application file for complete search history.

(56) References Cited

U.S. PATENT DOCUMENTS

| | | | |
|---|---|---|---|
| 9,569,446 B1* | 2/2017 | Feathergill | G06F 16/128 |
| 2012/0005379 A1* | 1/2012 | Dutch | G06F 11/1469 |
| | | | 710/31 |
| 2013/0305083 A1* | 11/2013 | Machida | G06F 11/008 |
| | | | 714/4.1 |

\* cited by examiner

*Primary Examiner* — Larry T Mackall
(74) *Attorney, Agent, or Firm* — Holland & Hart LLP

(57) ABSTRACT

An application server may receive an input indicating a recovery priority for recovering data from a data backup environment to a data source environment and may receive data usage statistics indicating data access metrics and user access metrics corresponding to the data in the data source environment. The application server may generate, from the recovery priority and the data usage statistics, one or more data priority classifications for the data and may build a data model indicating an order for recovery of the data based on the one or more data priority classifications. The application server may then cause display of an indication of a progress of recovering the data from the data backup environment to the data source environment.

20 Claims, 11 Drawing Sheets

TECHNIQUES FOR ACCELERATED DATA RECOVERY

FIELD OF TECHNOLOGY

The present disclosure relates generally to database systems and data processing, and more specifically to techniques for accelerated data recovery.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
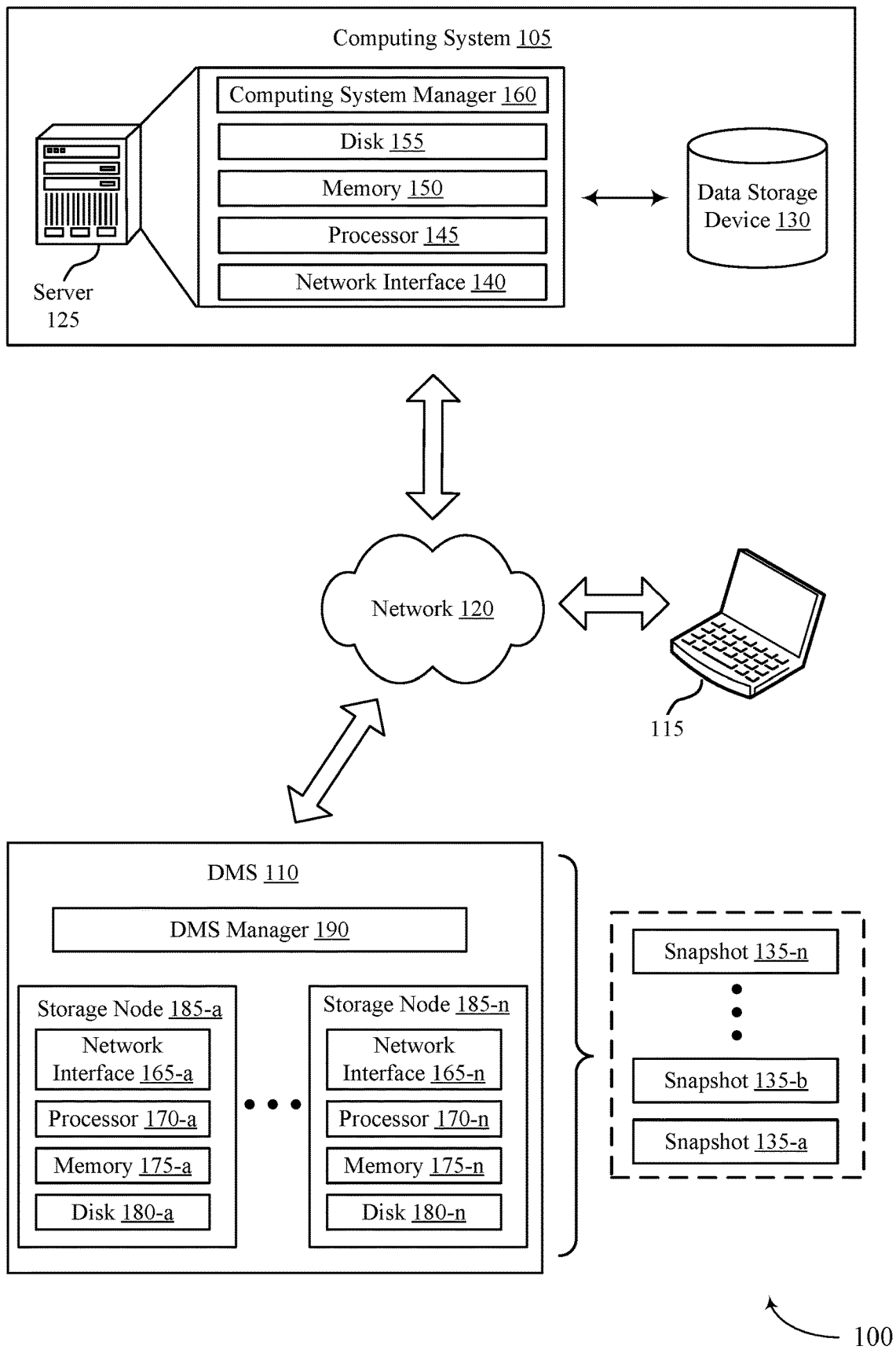
FIG. 1 illustrates an example of a computing environment that supports techniques for accelerated data recovery in accordance with aspects of the present disclosure.

A data recovery system may provide cloud and software as a service (SaaS) data protection for data against ransomware, corruption, accidental deletion, and purposeful deletion. Such threat vectors may often result in a wide impact resulting customers to perform data recovery at scale. However, completely restoring or recovering data for a customer can be resource and time intensive, and in some examples, a system (e.g., a compromised system) may remain inoperable and/or the data inaccessible during the recovery process. In some examples, data recovery techniques may restore data and systems without any knowledge of the data priority from the perspective of the business operations of the customer. Additionally or alternatively, some data recovery techniques may restore data and systems in a sequential manner. Thus, in case of complete data recovery for a system, some data (that are critical to keeping the system operational) may remain inaccessible for an unnecessarily long time thereby impacting the business operations of the customer.

To restore a customer's most critical data quickly during a recovery process, one or more techniques of the present disclosure provide for extracting one or more insights for data being backed up by a data recovery system. Additionally or alternatively, the data recovery system may build or otherwise implement a relevance model for the data based on the insights extracted from data and/or data insights provided by customers. In some examples, the data recovery system may receive an input indicating a recovery priority for recovering data from a data backup environment to a data source environment. For instance, the data recovery system may receive information associated with a particular customer (e.g., from an administrator) and may build insights based on the received information. For example, an administrator may indicate identifiers of the key users whose data may be restored first, in case of a data recovery procedure. In addition, the data recovery system may receive or otherwise retrieve data usage statistics indicating data access metrics and user access metrics corresponding to the data in the data source environment. The data recovery system may generate, from the recovery priority and the data usage statistics, one or more data priority classifications for the data.

In some examples, the data recovery system may build insights on data using data usage statistics. The data recovery system may use data and/or workflow specific insights to build data relevancy models. In some examples, the data recovery system may gather knowledge based on how the business (whose data is being restored) uses the data. The data recovery system may then use the data relevancy models to compute a working set of data for recovery which is relevant for a scenario or workflow for the services to be functional. In one example, in case of data loss, the data recovery system may identify a set of key users (e.g., provided by the administrator) for prioritized recovery. The data recovery system may also use the data relevancy models to identify the type of data for recovery for each prioritized user and a schedule for such recovery. In some examples, when restoring data, the data recovery system may cause display of an indication of a progress of recovering the data from the data backup environment to the data source environment. Upon completion of the prioritized recovery, the data recovery system may resume recovery of the remaining data asynchronously in the background over a longer period of time. Thus, aspects of the present disclosure provide for prioritized recovery of a subset of the entire data thereby restoring critical and/or time sensitive operations for the customer prior to recovering the entire data.

Aspects of the disclosure are initially described in the context of an environment supporting an on-demand database service. Aspects of the disclosure are further illustrated by and described with reference to system diagrams and a process flow. Aspects of the disclosure are further illustrated by and described with reference to apparatus diagrams, system diagrams, and flowcharts that relate to techniques for accelerated data recovery.

FIG. 1 illustrates an example of a computing environment 100 for cloud computing that supports techniques for accelerated data recovery in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

Cloud and SaaS data protection provides for protecting data at a large scale. In some examples, the computing system 105 may provide for backing up data from a data source environment to a data backup environment. The computing system 105 may provide protection for data against ransomware, corruption, accidental deletion, and purposeful deletion. Threat vectors which put data at risk such as ransomware, corruption, accidental deletion, purposeful deletion may often result in a wide impact resulting customers to perform data recovery at scale. Some use cases of data restoration or recovery may try to restore complete data. Such recovery measures may be hard to scale and may consume a large amount of time. Often times, recovering data at scale for services to be operational to perform business functions may take a large amount of time due to size of data, networking bandwidth available and operational constraints placed by SaaS providers.

The computing system 105 may utilize techniques depicted in the present disclosure to perform a prioritized data recovery. The computing system 105 receives an input from a customer for a prioritized data recovery. In particular, the computing system 105 may receive an input indicating a recovery priority for recovering data from a data backup environment to a data source environment. The data source environment may refer to data residing on computing devices at the customer side. The data backup environment may refer to or otherwise include DMS 110. The data backup environment may periodically back up data from the data source environment. This computing system 105 may extract insights from data when backing up from the data source environment. For example, the computing system 105 may perform an extraction of a first set of data usage statistics indicating data access metrics and user access metrics. The computing system 105 may then build a model (e.g., a relevance model) based on insights extracted from data and/or data insights provided by an administrator. The computing system 105 may determine data usage statistics indicating the data access metrics and the user access metrics corresponding to the data in the data source environment. The computing system 105 may generate, from the recovery priority and the data usage statistics, one or more data priority classifications for the data and may build a data model indicating an order for recovery of the data based on the one or more data priority classifications.

Upon receiving an indication of data loss, the computing system 105 may implement the data model to recover a subset of the backed up data from the data backup environment. The computing system 105 may identify, based on user access metrics, a first set of users having a first priority level and a second set of users having a second priority level. The computing system 105 may determine that the first priority level is greater than the second priority level. The computing system 105 may then compute a working set of data to recover which is relevant for a scenario or workflow for the underneath services to be functional. For example, the computing system 105 may recover data corresponding to the first set of users having the first priority level prior to recovering data corresponding to the second set of users having the second priority level. Upon recovery of the data belonging to the first set of users, the data source environment may be functional. In case of data loss at the data source environment, the computing system 105 may first restore a working data set including a small percentage of data. Thus, by restoring the working set, the techniques depicted herein accelerates operational recovery at cloud scale. The computing system 105 may recover the rest of the data asynchronously in the background over a period of time after the data source environment is operational.

Figure 2:
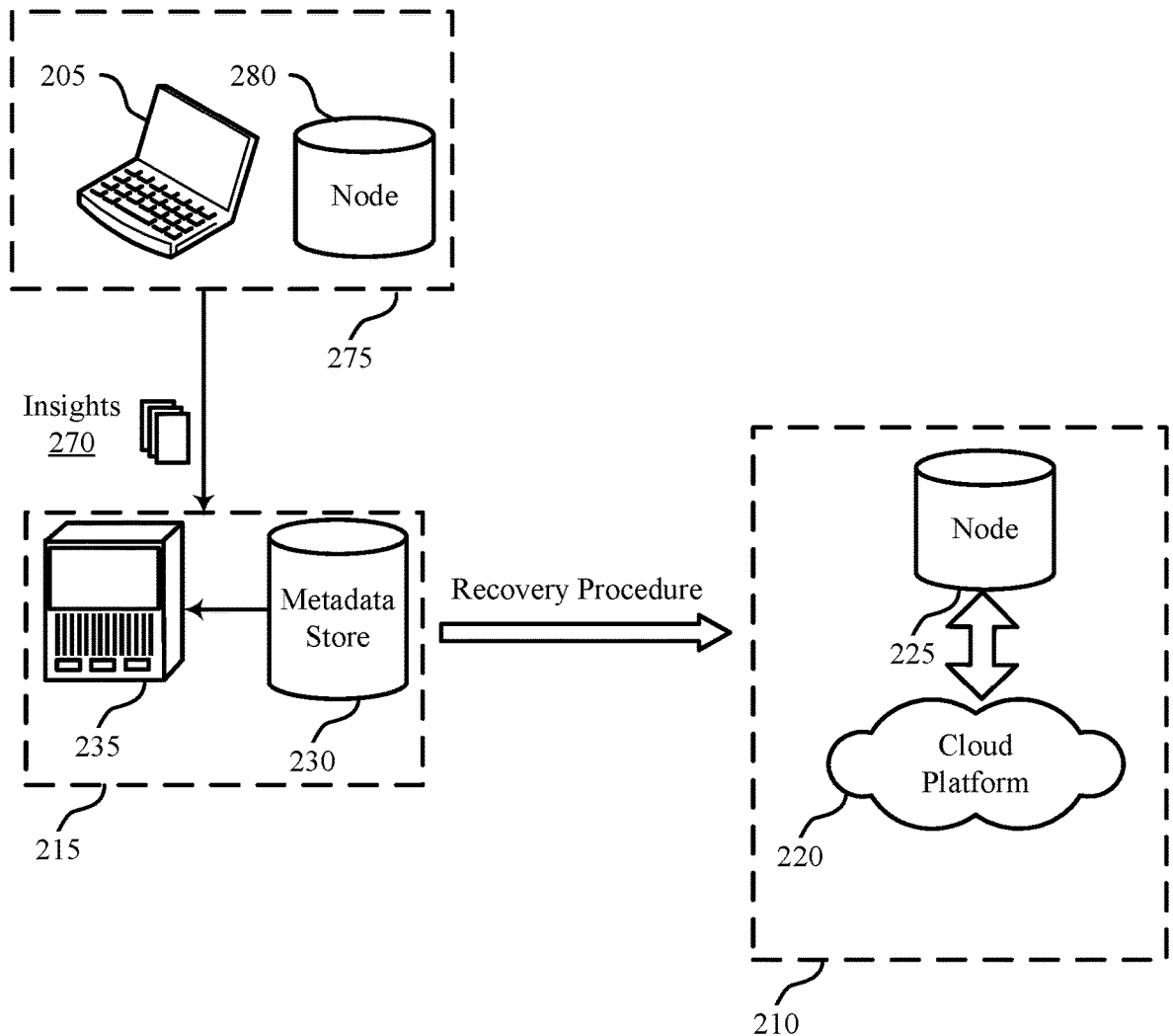
FIG. 2 illustrates an example of a computing system that supports techniques for accelerated data recovery in accordance with aspects of the present disclosure.

FIG. 2 illustrates an example of a computing system 200 that supports techniques for accelerated data recovery in accordance with aspects of the present disclosure. The computing system 200 includes a user device 205, a data center 210 and a data manager 215. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The data center 210 may include a computing node 225. Although not depicted herein, the data center 210 may include more than one computing node 225. As depicted in the example of FIG. 2, the data center 210 may include a cloud platform 220. The cloud platform 220 may offer an on-demand storage, backup and computing services to the user device 205. In some cases, the data center 210 may be an example of a storage system with built-in data management. The data center 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include a metadata store 230 and an application server 235. The metadata store 230 and the application server 235 may collectively represent a unified storage system even though numerous storage nodes may be connected together and the number of connected storage nodes may change over time as storage nodes are added to or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 supports backup management for data sources. In some examples, the data manager 215 may receive an input indicating a recovery priority for recovering data from a data backup environment to a data source environment. In the example of FIG. 2, the data source environment 275 may include a user device 205 and a database node 280. The data manager 215 may also receive data usage statistics indicating data access metrics and user access metrics corresponding to the data in the data source environment. In some examples, the data manager 215 may perform an extraction of a first set of data usage statistics indicating the data access metrics and the user access metrics. The data manager 215 may receive a second set of data usage statistics associated with past data recovery from the data backup environment to the data source environment. The data manager 215 may generate, from the recovery priority and the data usage statistics, one or more data priority classifications for the data. The data manager 215 may build a data model indicating an order for recovery of the data based on the one or more data priority classifications. The data manager 215 may build the data model based on the first set of data usage statistics received from the data source environment 275 and the second set of data usage statistics based on past data recovery performed at the data manager 215.

In some examples, the data manager 215 may build a data model that indicates that in case of data recovery, the data manager 215 is to recover data corresponding to a set of users. For instance, a customer representative (e.g., administrator) may provide user access metrics indicating a corresponding priority level associated with each user. The data manager 215 may determine to recover data for users having a priority level greater than a threshold priority prior to recovering data for the remaining users. In some cases, the customer representative (e.g., administrator) may input user information identifying the users for accelerated data recovery.

In the example of FIG. 2, the data manager 215 may identify, based on the user access metrics, a first set of users having a first priority level and a second set of users having a second priority level. A user may transmit a request including insights 270. In case of a data loss at the data source environment 275, the data manager 215 may recover data corresponding to the first set of users having the first priority level prior to recovering data corresponding to the second set of users having the second priority level. In some examples, the data manager 215 may identify (from metadata store 230) statistics associated with one or more workflows. In such cases, the data manager 215 may build the data model based on the statistics associated with the one or more workflows.

The data center 210 (e.g., data storage infrastructure) may include or otherwise support recovery of data in accordance with a data model. In such a setup, utilizing the techniques depicted herein, the system 200 may manage data recovery according to an order such that the data is operational upon completion of the recovery of data for a subset of users prior to completing the recovery of data for all remaining users.

The data manager 215 may receive a request to recover data from the data backup environment to the data source environment 275. The data backup environment may include the data center 210. Upon receiving the request to recover data, the data manager 215 may identify a set of workflows associated with the data and a set of users associated with each workflow. In some examples, the set of users may have a set of recovery priorities. In some examples, the data manager 215 may recover the data from the data backup environment to the data source environment in accordance with identifying the set of workflows. Additionally or alternatively, upon receiving the request to recover data, the data manager 215 may initiate recovery of data for a subset of users associated with the data in accordance with the order for recovery of the data. After recovering the data for the subset of users, the data manager 215 may initiate recovery of data for remaining users associated with the data. Thus, the data manager 215 may implement techniques to perform an accelerated recovery of data in case of a data loss at a data source environment such that the data source environment becomes operational prior to the complete recovery of data. In particular, the data manager 215 in conjunction with the data center 210 (e.g., data storage infrastructure) may speed up data recovery by leveraging relevancy knowledge to determine the data that is restored first according to a priority. The data manager 215 may also perform data acquisitions and build data insights based on the nature of data, type of the data, data relevancy, data recency, data workflows, data generation and data consumption scenarios.

Figure 3:
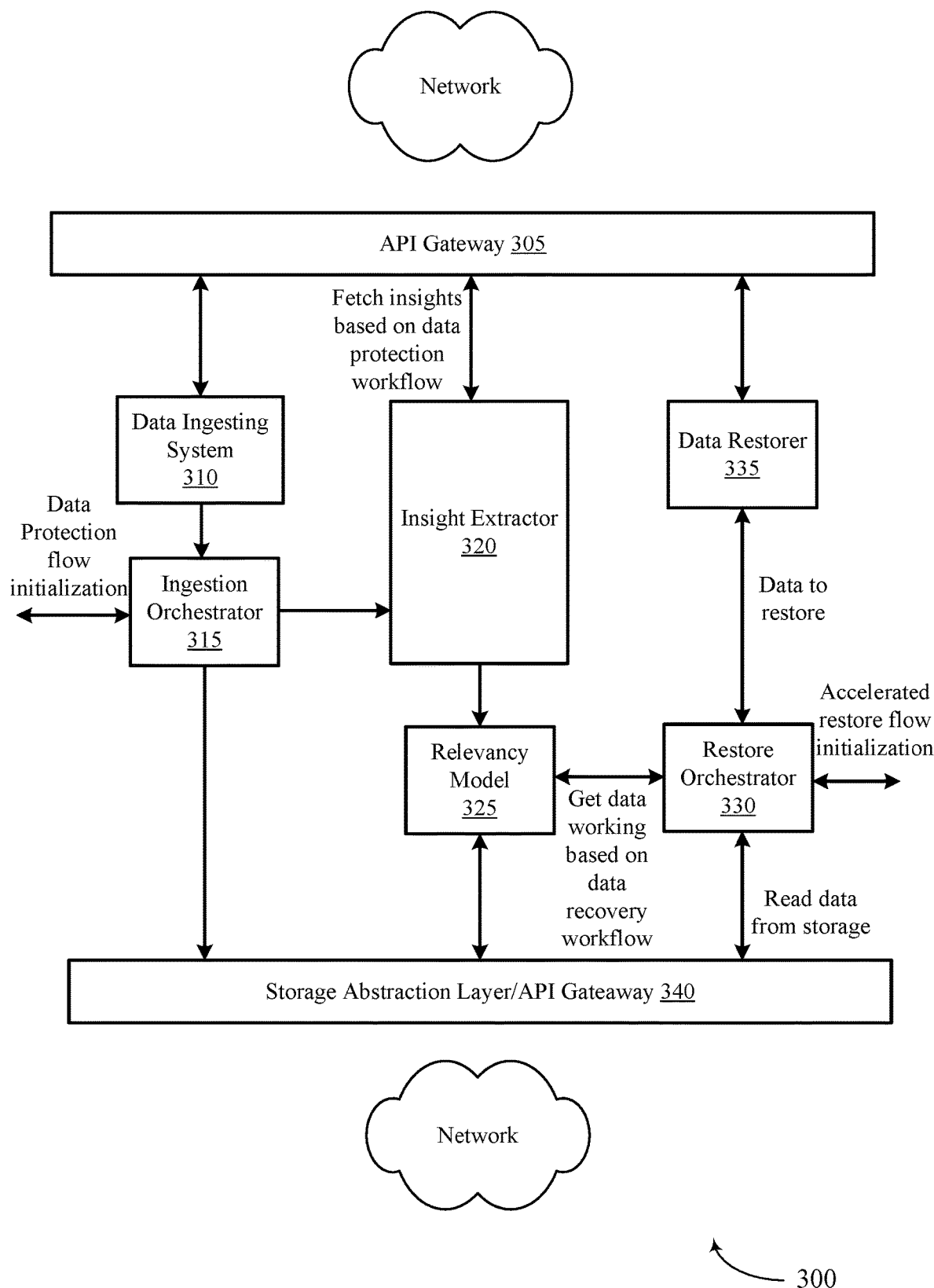
FIG. 3 illustrates an example of a data recovery system that supports techniques for accelerated data recovery in accordance with aspects of the present disclosure.

FIG. 3 illustrates an example of a data recovery system 300 that supports techniques for accelerated data recovery in accordance with aspects of the present disclosure. The data recovery system 300 may include an API gateway 305, a data ingesting system 310, an ingestion orchestrator 315, an insight extractor 320, a relevancy model 325, a restore orchestrator 330, a data restorer 335, and a storage abstraction layer 340.

The ingestion orchestrator 315 and the data ingesting system 310 may initiate a data protection flow. The data ingesting system 310 may receive data for backing up from a data source environment. The data ingesting system 310 may access the data storage environment via API gateway 305. In some examples, the ingestion orchestrator 315 may initiate the data retrieval via data ingesting system 310. The ingestion orchestrator 315 may send the data to the insight extractor 320 for extracting insights.

The insight extractor 320 may receive an input indicating a recovery priority for recovering data from a data backup environment to a data source environment. Additionally, the insight extractor 320 may receive data usage statistics indicating data access metrics and user access metrics corresponding to the data in the data source environment. In some examples, the insight extractor 320 may fetch insights based on data protection workflow via the API gateway 305. The insight extractor 320 may retrieve a set of data usage statistics indicating data access metrics and user access metrics. For example, the set of data usage statistics may indicate which users interact with the data on a regular basis and thus have a high priority during restoration of the data. Additionally or alternatively, the insight extractor 320 may retrieve data access metrics for the data retrieved via the data ingesting system 310 and the ingestion orchestrator 315.

The insight extractor 320 may generate one or more data priority classifications for the data based on recovery priority and data usage statistics. The insight extractor 320 may forward the one or more data priority classifications to the relevancy model 325. The relevancy model 325 may build a data model indicating an order for recovery of the data based on the one or more data priority classifications. The relevancy model 325 may build the data model based on a first set of data usage statistics indicating data access metrics and user access metrics and a second set of data usage statistics associated with past data recovery from the data backup environment to the data source environment. The relevancy model 325 may receive past data insights generated by the insight extractor 320. The past data insights may be associated with the same type of data or the same data source environment. According to aspects depicted herein, these insights may be augmented with insights received from other relevant SaaS environments. From the combined insights, the relevancy model 325 may generate a model to compute a relevant recovery data subset associated with underlying services and/or scenarios to be operational without waiting for a full data set recovery. As the size of relevant recovery data is small, this method helps in faster restoration of services at scale to unlock immediate needs, to unlock business operations.

The data restorer 335 may receive an indication to initiate restoration of data from a data backup environment to a data source environment. The restore orchestrator 330 may initiate an accelerated restore flow and may identify a subset of data to restore in accordance with the order for recovery of the data. The restore orchestrator 330 in combination with the relevancy model 325 to identify the subset of data. In some examples, the restore orchestrator 330 may identify a set of users associated with a particular priority level (or associated with a priority level greater than a threshold). The restore orchestrator 330 may then restore the data associated with those users prior to restoring the data associated with the remaining users. Additionally or alternatively, the restore orchestrator 330 may identify a subset of data associated with each user and may then restore the subset of data for each user. The restore orchestrator 330 may, in some cases, identify a set of workflows based on workflow-specific insights. The restore orchestrator 330 may then restore data associated with the set of workflows prior to restoring the remaining data. In some examples, the restore orchestrator 330 may read the data from the data storage environment from storage abstraction layer 340. In some examples, the restore orchestrator 330 may cause display of an indication of a progress of recovering the data from the data backup environment to the data source environment. For example, the restore orchestrator 330 may cause display of a timeline indicating a progress of data recovery. After reinstating a working set of data (e.g., data that renders the data source environment operable), the restore orchestrator 330 may continue recovery of data in the background. Accordingly, the restore orchestrator 330 may continue to update the indication of the progress data recovery until the entire data has been restored.

Figure 4:
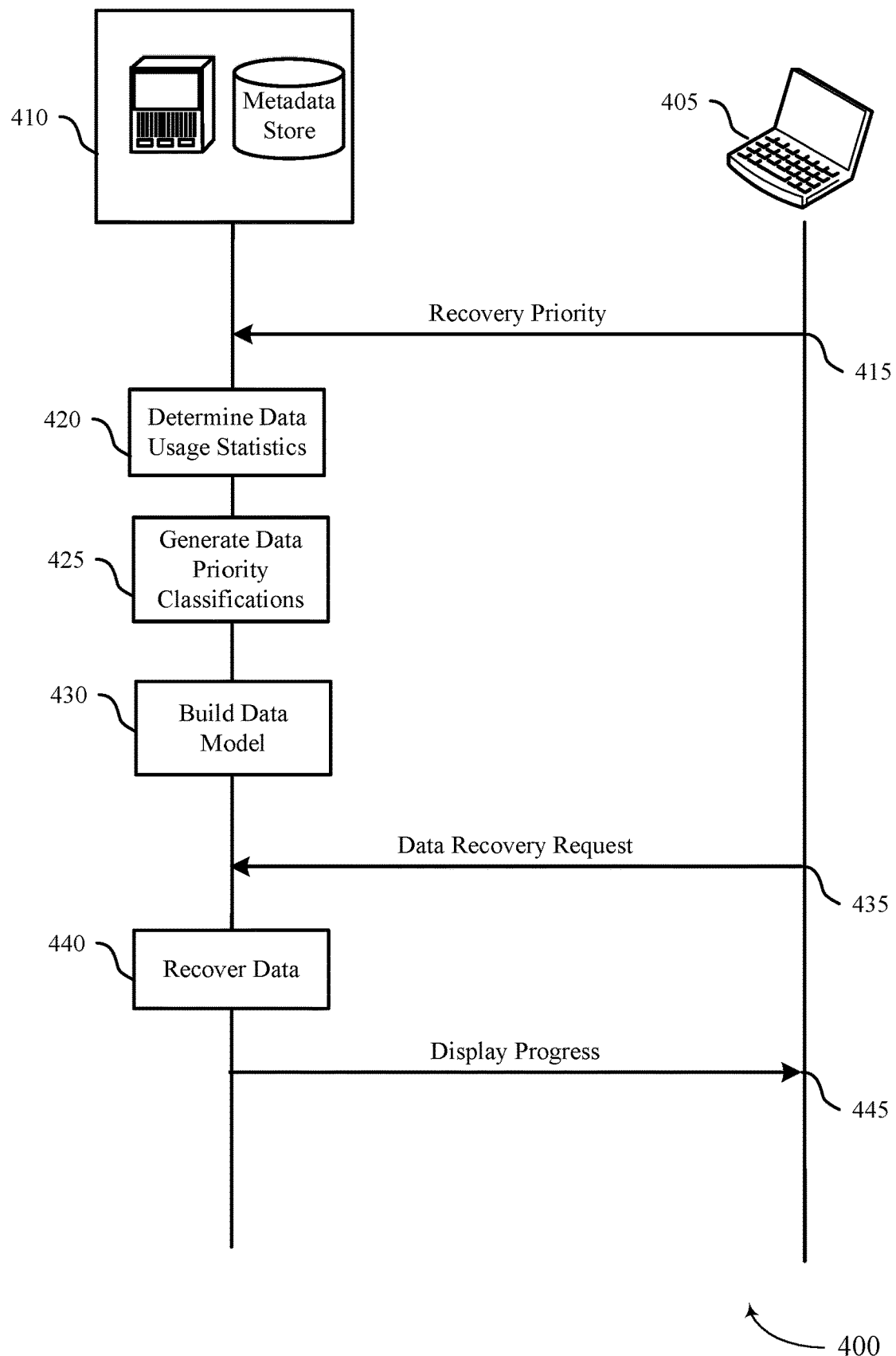
FIG. 4 illustrates an example of a process flow that supports techniques for accelerated data recovery in accordance with aspects of the present disclosure.

FIG. 4 illustrates an example of a process flow 400 that supports techniques for accelerated data recovery in accordance with aspects of the present disclosure. The process flow 400 includes a data management platform 410 and a user device 405. The data management platform 410 may include an application server and a metadata storage as described with respect to FIG. 2. The user device 405 may include a user device as described with respect to FIG. 2. Although a single entity is depicted as data management platform 410, it may be understood that components of the data management platform 410 may be located in different locations.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the data management platform 410 may receive an input indicating a recovery priority for recovering data from a data backup environment to a data source environment. At 420, the data management platform 410 may receive or determine data usage statistics indicating data access metrics and user access metrics corresponding to the data in the data source environment. In some examples, the data usage statistics include at least one of a nature of data, a type of the data, data relevancy, data recency, data workflow, data generation, data consumption, or a combination thereof.

At 425, the data management platform 410 may generate, from the recovery priority and the data usage statistics, one or more data priority classifications for the data. At 430, the data management platform 410 may build a data model indicating an order for recovery of the data based on the one or more data priority classifications.

In some examples, the data management platform 410 may perform an extraction of a first set of data usage statistics indicating the data access metrics and the user access metrics. The data management platform 410 may receive a second set of data usage statistics associated with past data recovery from the data backup environment to the data source environment. In such cases, the data management platform 410 may build the data model based on the first set of data usage statistics and the second set of data usage statistics. In some examples, the data management platform 410 may receive statistics associated with one or more workflows. The data management platform 410 may build the data model based on the statistics associated with the one or more workflows.

At 435, the data management platform 410 may receive a request to recover data from the data backup environment to the data source environment. At 440, the data management platform 410 may perform recovery of the data. In some examples, the data management platform 410 may identify, based on the user access metrics, a first set of users having a first priority level and a second set of users having a second priority level. The data management platform 410 may recover data corresponding to the first set of users having the first priority level prior to recovering data corresponding to the second set of users having the second priority level.

In some cases, the data management platform 410 may identify a set of workflows associated with the data and a set of users associated with each workflow, the set of users having a set of recovery priorities. The data management platform 410 may recover the data from the data backup environment to the data source environment in accordance with identifying the set of workflows. Additionally or alternatively, the data management platform 410 may initiate recovery of data for a subset of users associated with the data in accordance with the order for recovery of the data. The data management platform 410 may then initiate recovery of data for remaining users associated with the data upon completion of the recovery of data for the subset of users. In such cases, the data may be operational upon completion of the recovery of data for the subset of users.

At 445, the data management platform 410 may cause display of an indication of a progress of recovering the data from the data backup environment to the data source environment. The display of the indication of progress of recovering the data from the data backup environment may be displayed in accordance with the order for recovery of the data.

Figure 5:
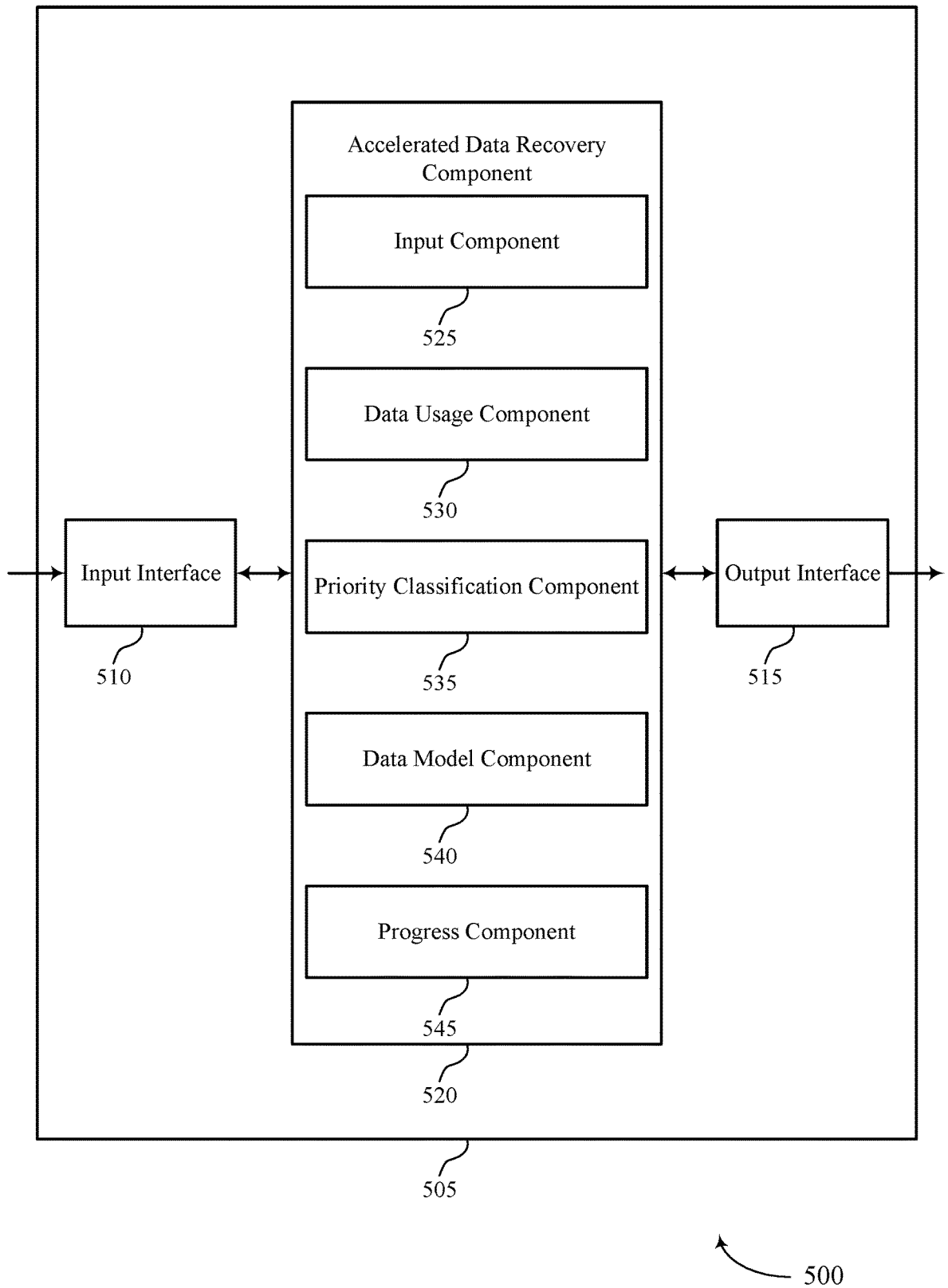
FIG. 5 shows a block diagram of an apparatus that supports techniques for accelerated data recovery in accordance with aspects of the present disclosure.

FIG. 5 shows a block diagram 500 of a device 505 that supports techniques for accelerated data recovery in accordance with aspects of the present disclosure. In some examples, the system 505 may be an example of aspects of one or more components described with reference to FIG. 1, such as a DMS 110. The system 505 may include an input interface 510, an output interface 515, and an accelerated data recovery component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the accelerated data recovery component 520 to support accelerated data recovery. In some cases, the input interface 510 may be a component of a network interface 140 as described with reference to FIG. 1.

The output interface 515 may manage output signaling for the system 505. For example, the output interface 515 may receive signaling from other components of the system 505, such as the accelerated data recovery component 520, and may transmit such output signaling corresponding to (e.g., representative of or otherwise based on) such signaling to other systems or devices. In some cases, the output interface 515 may be a component of a network interface 715 as described with reference to FIG. 7.

For example, the accelerated data recovery component 520 may include an input component 525, a data usage component 530, a priority classification component 535, a data model component 540, a progress component 545, or any combination thereof. In some examples, the accelerated data recovery component 520, or various components thereof, may be configured to perform various operations (e.g., receiving, monitoring, transmitting) using or otherwise in cooperation with the input interface 510, the output interface 515, or both. For example, the accelerated data recovery component 520 may receive information from the input interface 510, send information to the output interface 515, or be integrated in combination with the input interface 510, the output interface 515, or both to receive information, transmit information, or perform various other operations as described herein.

The accelerated data recovery component 520 may support data recovery in accordance with examples as disclosed herein. The input component 525 may be configured as or otherwise support a means for receiving an input indicating a recovery priority for recovering data from a data backup environment to a data source environment. The data usage component 530 may be configured as or otherwise support a means for receiving data usage statistics indicating data access metrics and user access metrics corresponding to the data in the data source environment. The priority classification component 535 may be configured as or otherwise support a means for generating, from the recovery priority and the data usage statistics, one or more data priority classifications for the data. The data model component 540 may be configured as or otherwise support a means for building a data model indicating an order for recovery of the data based on the one or more data priority classifications. The progress component 545 may be configured as or otherwise support a means for causing display of an indication of a progress of recovering the data from the data backup environment to the data source environment.

Figure 6:
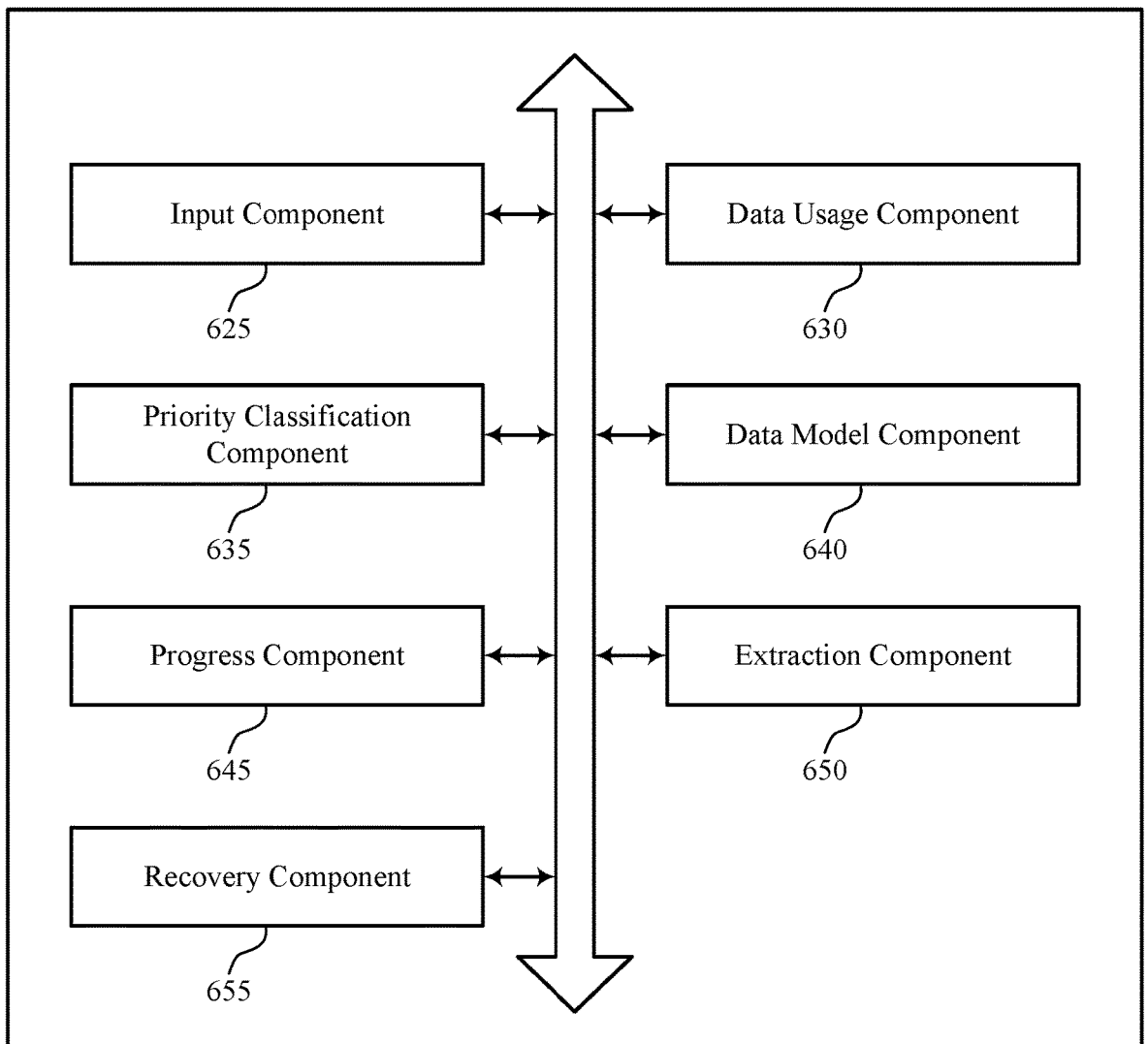
FIG. 6 shows a block diagram of an accelerated data recovery component that supports techniques for accelerated data recovery in accordance with aspects of the present disclosure.

FIG. 6 shows a block diagram 600 of an accelerated data recovery component 620 that supports techniques for accelerated data recovery in accordance with aspects of the present disclosure. The accelerated data recovery component 620 may be an example of aspects of an accelerated data recovery component 520 as described herein. The accelerated data recovery component 620, or various components thereof, may be an example of means for performing various aspects of techniques for accelerated data recovery as described herein. For example, the accelerated data recovery component 620 may include an input component 625, a data usage component 630, a priority classification component 635, a data model component 640, a progress component 645, an extraction component 650, a recovery component 655, or any combination thereof. Each of these components may communicate, directly or indirectly, with one another (e.g., via one or more buses, communications links, communications interfaces, or any combination thereof).

The accelerated data recovery component 620 may support data recovery in accordance with examples as disclosed herein. The input component 625 may be configured as or otherwise support a means for receiving an input indicating a recovery priority for recovering data from a data backup environment to a data source environment. The data usage component 630 may be configured as or otherwise support a means for receiving data usage statistics indicating data access metrics and user access metrics corresponding to the data in the data source environment. The priority classification component 635 may be configured as or otherwise support a means for generating, from the recovery priority and the data usage statistics, one or more data priority classifications for the data. The data model component 640 may be configured as or otherwise support a means for building a data model indicating an order for recovery of the data based on the one or more data priority classifications. The progress component 645 may be configured as or otherwise support a means for causing display of an indication of a progress of recovering the data from the data backup environment to the data source environment.

In some examples, the extraction component 650 may be configured as or otherwise support a means for performing an extraction of a first set of data usage statistics indicating the data access metrics and the user access metrics. In some examples, the data usage component 630 may be configured as or otherwise support a means for receiving a second set of data usage statistics associated with past data recovery from the data backup environment to the data source environment, where building the data model is further based on the first set of data usage statistics and the second set of data usage statistics.

In some examples, the data usage component 630 may be configured as or otherwise support a means for identifying, based on the user access metrics, a first set of users having a first priority level and a second set of users having a second priority level. In some examples, the recovery component 655 may be configured as or otherwise support a means for recovering data corresponding to the first set of users having the first priority level prior to recovering data corresponding to the second set of users having the second priority level.

In some examples, the data model component 640 may be configured as or otherwise support a means for receiving statistics associated with one or more workflows, where building the data model is based on the statistics associated with the one or more workflows.

In some examples, the recovery component 655 may be configured as or otherwise support a means for receiving a request to recover data from the data backup environment to the data source environment. In some examples, the data usage component 630 may be configured as or otherwise support a means for identifying a set of workflows associated with the data and a set of users associated with each workflow, the set of users having a set of recovery priorities. In some examples, the recovery component 655 may be configured as or otherwise support a means for recovering the data from the data backup environment to the data source environment in accordance with identifying the set of workflows.

In some examples, the recovery component 655 may be configured as or otherwise support a means for receiving a request to recover the data from the data backup environment to the data source environment. In some examples, the recovery component 655 may be configured as or otherwise support a means for initiating recovery of data for a subset of users associated with the data in accordance with the order for recovery of the data. In some examples, the recovery component 655 may be configured as or otherwise support a means for initiating recovery of data for remaining users associated with the data upon completion of the recovery of data for the subset of users.

In some examples, the data is operational upon completion of the recovery of data for the subset of users. In some examples, the data usage statistics include at least one of a nature of data, a type of the data, data relevancy, data recency, data workflow, data generation, data consumption, or a combination thereof. In some examples, the display of the indication of progress of recovering the data from the data backup environment is displayed in accordance with the order for recovery of the data.

Figure 7:
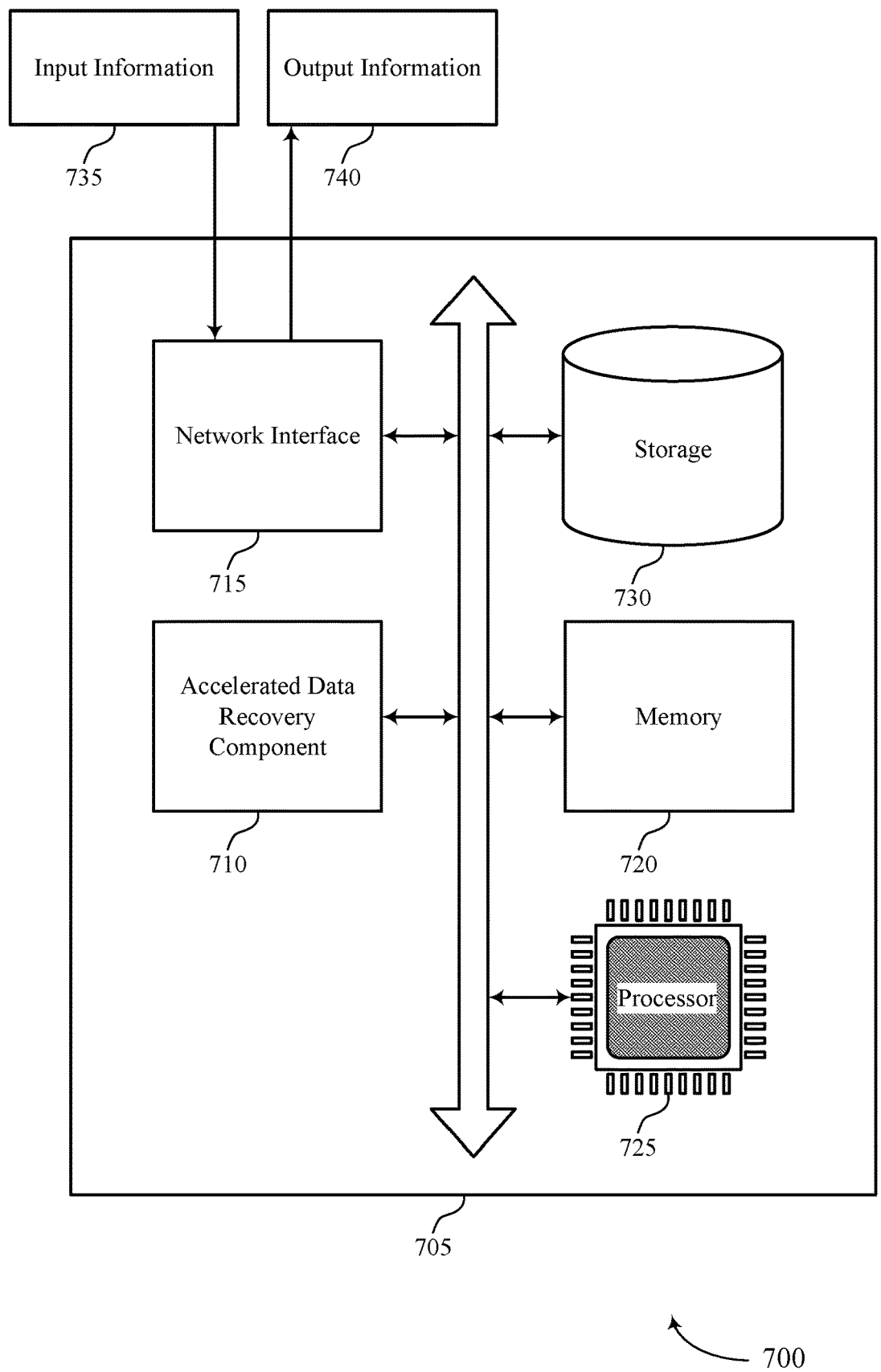
FIG. 7 shows a diagram of a system including a device that supports techniques for accelerated data recovery in accordance with aspects of the present disclosure.

FIG. 7 shows a diagram of a system 700 including a device 705 that supports techniques for accelerated data recovery in accordance with aspects of the present disclosure. The system 705 may be an example of or include aspects of a system 505 as described herein. The system 705 may include components for data management, including components such as an accelerated data recovery component 710, a network interface 715, memory 720, processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system 705 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting backup management for synchronized databases). Though a single processor 725 is depicted in the example of FIG. 7, it is to be understood that the system 705 may include any quantity of one or more of processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The accelerated data recovery component 710 may support data recovery in accordance with examples as disclosed herein. For example, the accelerated data recovery component 710 may be configured as or otherwise support a means for receiving an input indicating a recovery priority for recovering data from a data backup environment to a data source environment. The accelerated data recovery component 710 may be configured as or otherwise support a means for receiving data usage statistics indicating data access metrics and user access metrics corresponding to the data in the data source environment. The accelerated data recovery component 710 may be configured as or otherwise support a means for generating, from the recovery priority and the data usage statistics, one or more data priority classifications for the data. The accelerated data recovery component 710 may be configured as or otherwise support a means for building a data model indicating an order for recovery of the data based on the one or more data priority classifications. The accelerated data recovery component 710 may be configured as or otherwise support a means for causing display of an indication of a progress of recovering the data from the data backup environment to the data source environment.

Figure 8:
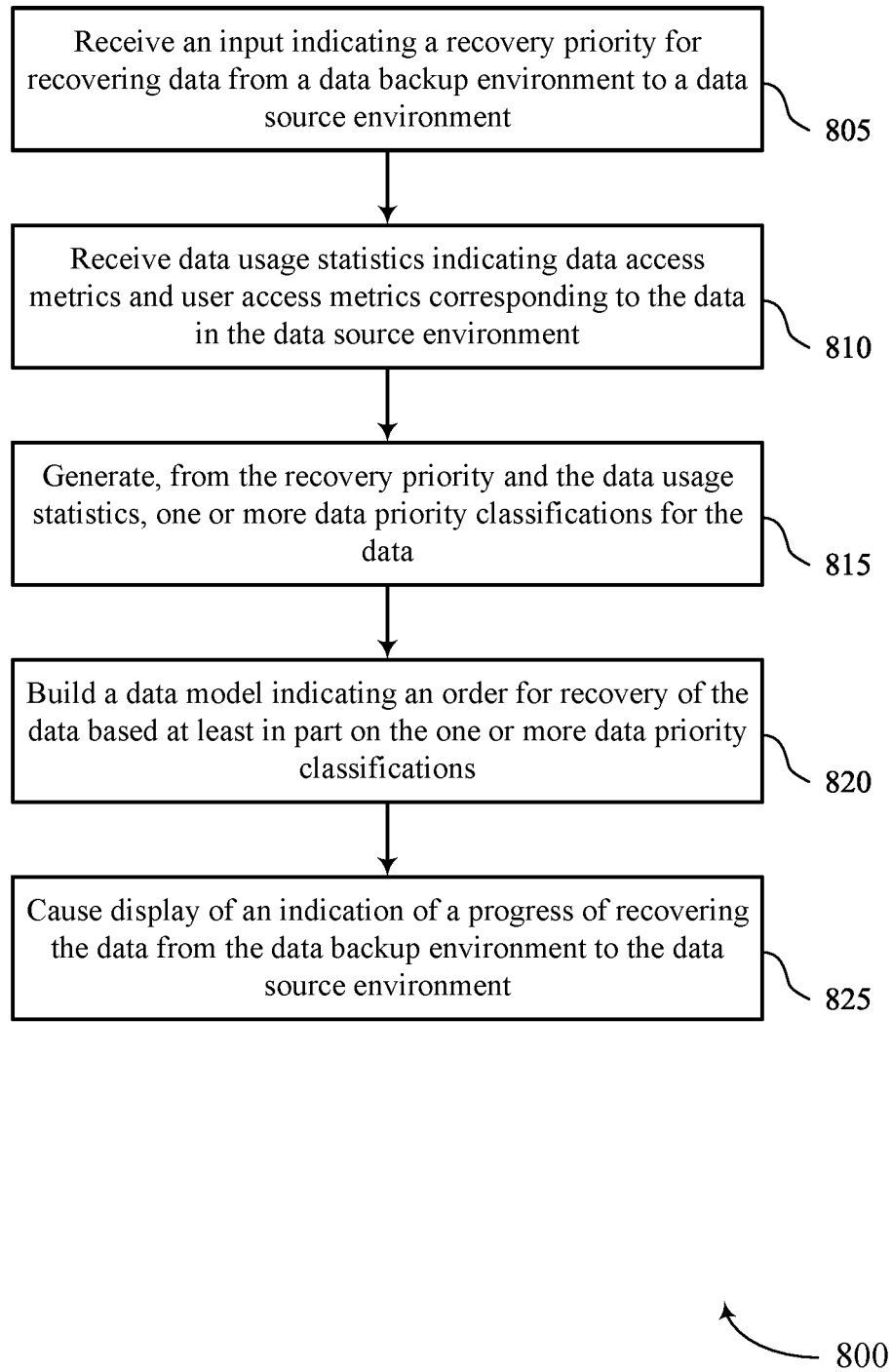
FIGS. 8 through 11 show flowcharts illustrating methods that support techniques for accelerated data recovery in accordance with aspects of the present disclosure.

FIG. 8 shows a flowchart illustrating a method 800 that supports techniques for accelerated data recovery in accordance with aspects of the present disclosure. The operations of the method 800 may be implemented by a system or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving an input indicating a recovery priority for recovering data from a data backup environment to a data source environment. The operations of 805 may be performed in accordance with examples as disclosed herein. In some examples, aspects of the operations of 805 may be performed by an input component 625 as described with reference to FIG. 6.

At 810, the method may include receiving data usage statistics indicating data access metrics and user access metrics corresponding to the data in the data source environment. The operations of 810 may be performed in accordance with examples as disclosed herein. In some examples, aspects of the operations of 810 may be performed by a data usage component 630 as described with reference to FIG. 6.

At 815, the method may include generating, from the recovery priority and the data usage statistics, one or more data priority classifications for the data. The operations of 815 may be performed in accordance with examples as disclosed herein. In some examples, aspects of the operations of 815 may be performed by a priority classification component 635 as described with reference to FIG. 6.

At 820, the method may include building a data model indicating an order for recovery of the data based on the one or more data priority classifications. The operations of 820 may be performed in accordance with examples as disclosed herein. In some examples, aspects of the operations of 820 may be performed by a data model component 640 as described with reference to FIG. 6.

At 825, the method may include causing display of an indication of a progress of recovering the data from the data backup environment to the data source environment. The operations of 825 may be performed in accordance with examples as disclosed herein. In some examples, aspects of the operations of 825 may be performed by a progress component 645 as described with reference to FIG. 6.

Figure 9:
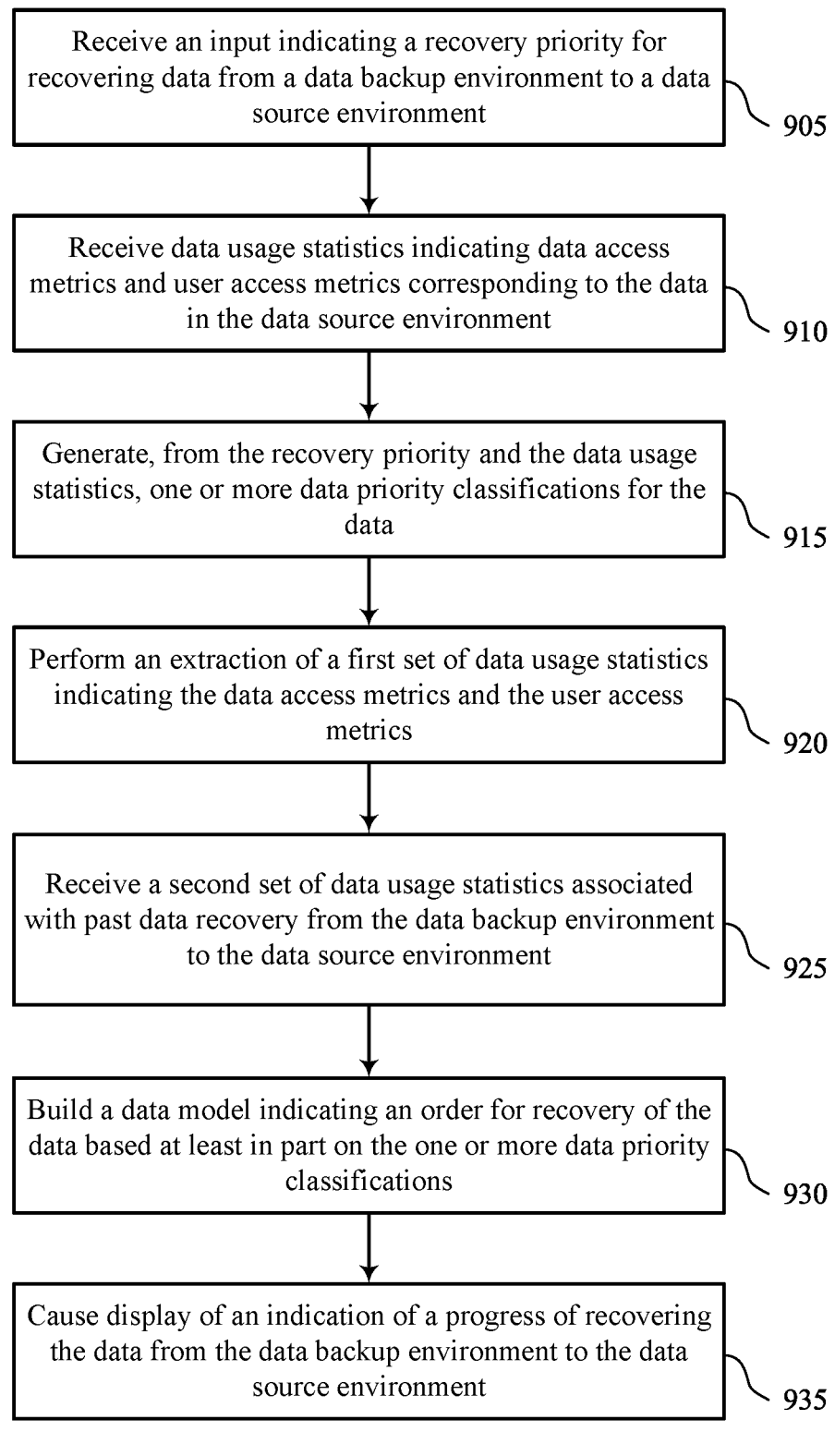

FIG. 9 shows a flowchart illustrating a method 900 that supports techniques for accelerated data recovery in accordance with aspects of the present disclosure. The operations of the method 900 may be implemented by a system or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include receiving an input indicating a recovery priority for recovering data from a data backup environment to a data source environment. The operations of 905 may be performed in accordance with examples as disclosed herein. In some examples, aspects of the operations of 905 may be performed by an input component 625 as described with reference to FIG. 6.

At 910, the method may include receiving data usage statistics indicating data access metrics and user access metrics corresponding to the data in the data source environment. The operations of 910 may be performed in accordance with examples as disclosed herein. In some examples, aspects of the operations of 910 may be performed by a data usage component 630 as described with reference to FIG. 6.

At 915, the method may include generating, from the recovery priority and the data usage statistics, one or more data priority classifications for the data. The operations of 915 may be performed in accordance with examples as disclosed herein. In some examples, aspects of the operations of 915 may be performed by a priority classification component 635 as described with reference to FIG. 6.

At 920, the method may include performing an extraction of a first set of data usage statistics indicating the data access metrics and the user access metrics. The operations of 920 may be performed in accordance with examples as disclosed herein. In some examples, aspects of the operations of 920 may be performed by an extraction component 650 as described with reference to FIG. 6.

At 925, the method may include receiving a second set of data usage statistics associated with past data recovery from the data backup environment to the data source environment. The operations of 925 may be performed in accordance with examples as disclosed herein. In some examples, aspects of the operations of 925 may be performed by a data usage component 630 as described with reference to FIG. 6.

At 930, the method may include building a data model indicating an order for recovery of the data based on the one or more data priority classifications. In some examples, building the data model is further based on the first set of data usage statistics and the second set of data usage statistics. The operations of 930 may be performed in accordance with examples as disclosed herein. In some examples, aspects of the operations of 930 may be performed by a data model component 640 as described with reference to FIG. 6.

At 935, the method may include causing display of an indication of a progress of recovering the data from the data backup environment to the data source environment. The operations of 935 may be performed in accordance with examples as disclosed herein. In some examples, aspects of the operations of 935 may be performed by a progress component 645 as described with reference to FIG. 6.

Figure 10:
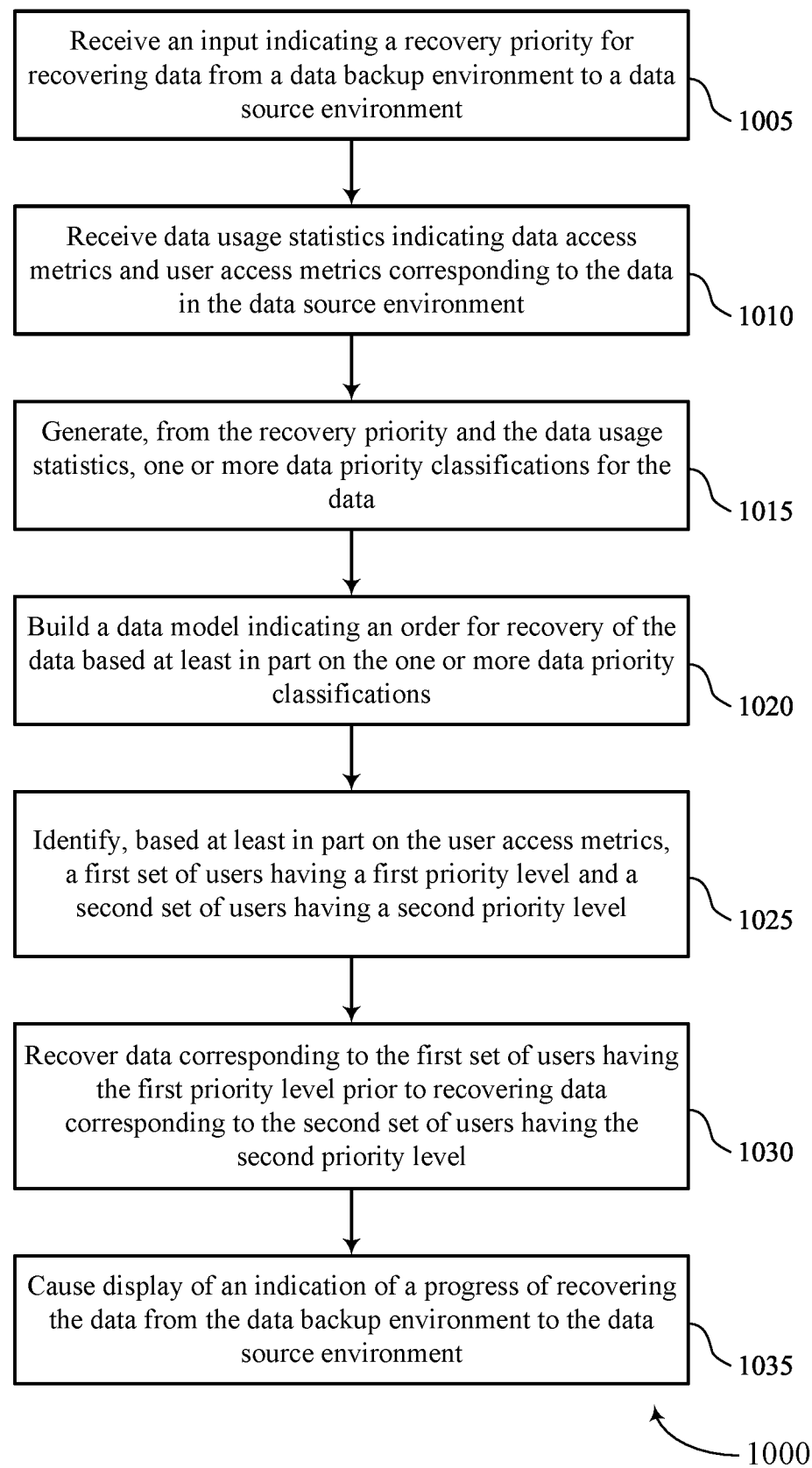

FIG. 10 shows a flowchart illustrating a method 1000 that supports techniques for accelerated data recovery in accordance with aspects of the present disclosure. The operations of the method 1000 may be implemented by a system or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include receiving an input indicating a recovery priority for recovering data from a data backup environment to a data source environment. The operations of 1005 may be performed in accordance with examples as disclosed herein. In some examples, aspects of the operations of 1005 may be performed by an input component 625 as described with reference to FIG. 6.

At 1010, the method may include receiving data usage statistics indicating data access metrics and user access metrics corresponding to the data in the data source environment. The operations of 1010 may be performed in accordance with examples as disclosed herein. In some examples, aspects of the operations of 1010 may be performed by a data usage component 630 as described with reference to FIG. 6.

At 1015, the method may include generating, from the recovery priority and the data usage statistics, one or more data priority classifications for the data. The operations of 1015 may be performed in accordance with examples as disclosed herein. In some examples, aspects of the operations of 1015 may be performed by a priority classification component 635 as described with reference to FIG. 6.

At 1020, the method may include building a data model indicating an order for recovery of the data based on the one or more data priority classifications. The operations of 1020 may be performed in accordance with examples as disclosed herein. In some examples, aspects of the operations of 1020 may be performed by a data model component 640 as described with reference to FIG. 6.

At 1025, the method may include identifying, based on the user access metrics, a first set of users having a first priority level and a second set of users having a second priority level. The operations of 1025 may be performed in accordance with examples as disclosed herein. In some examples, aspects of the operations of 1025 may be performed by a data usage component 630 as described with reference to FIG. 6.

At 1030, the method may include recovering data corresponding to the first set of users having the first priority level prior to recovering data corresponding to the second set of users having the second priority level. The operations of 1030 may be performed in accordance with examples as disclosed herein. In some examples, aspects of the operations of 1030 may be performed by a recovery component 655 as described with reference to FIG. 6.

At 1035, the method may include causing display of an indication of a progress of recovering the data from the data backup environment to the data source environment. The operations of 1035 may be performed in accordance with examples as disclosed herein. In some examples, aspects of the operations of 1035 may be performed by a progress component 645 as described with reference to FIG. 6.

Figure 11:
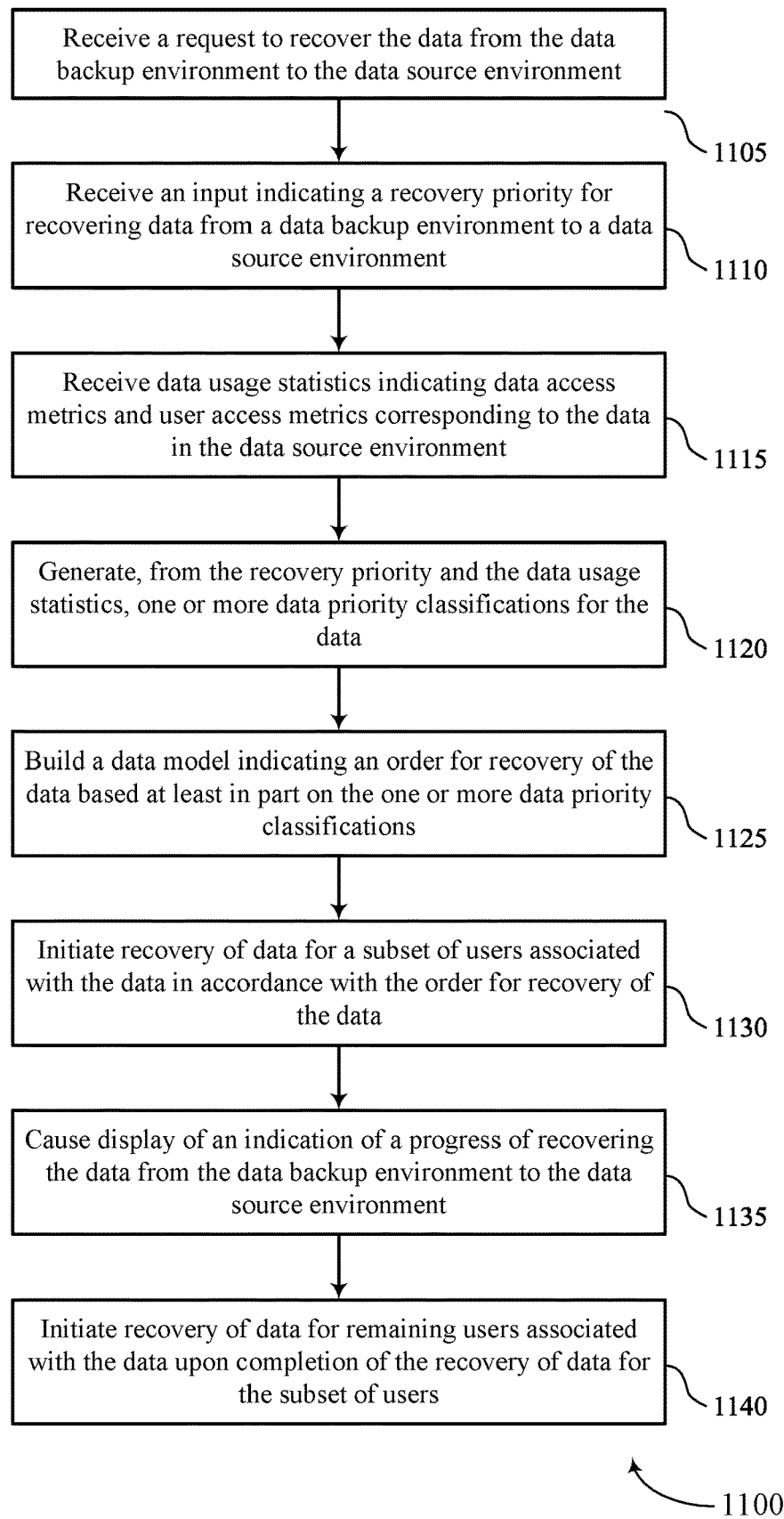

FIG. 11 shows a flowchart illustrating a method 1100 that supports techniques for accelerated data recovery in accordance with aspects of the present disclosure. The operations of the method 1100 may be implemented by a system or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include receiving a request to recover the data from the data backup environment to the data source environment. The operations of 1105 may be performed in accordance with examples as disclosed herein. In some examples, aspects of the operations of 1105 may be performed by a recovery component 655 as described with reference to FIG. 6.

At 1110, the method may include receiving an input indicating a recovery priority for recovering data from a data backup environment to a data source environment. The operations of 1110 may be performed in accordance with examples as disclosed herein. In some examples, aspects of the operations of 1110 may be performed by an input component 625 as described with reference to FIG. 6.

At 1115, the method may include receiving data usage statistics indicating data access metrics and user access metrics corresponding to the data in the data source environment. The operations of 1115 may be performed in accordance with examples as disclosed herein. In some examples, aspects of the operations of 1115 may be performed by a data usage component 630 as described with reference to FIG. 6.

At 1120, the method may include generating, from the recovery priority and the data usage statistics, one or more data priority classifications for the data. The operations of 1120 may be performed in accordance with examples as disclosed herein. In some examples, aspects of the operations of 1120 may be performed by a priority classification component 635 as described with reference to FIG. 6.

At 1125, the method may include building a data model indicating an order for recovery of the data based on the one or more data priority classifications. The operations of 1125 may be performed in accordance with examples as disclosed herein. In some examples, aspects of the operations of 1125 may be performed by a data model component 640 as described with reference to FIG. 6.

At 1130, the method may include initiating recovery of data for a subset of users associated with the data in accordance with the order for recovery of the data. The operations of 1130 may be performed in accordance with examples as disclosed herein. In some examples, aspects of the operations of 1130 may be performed by a recovery component 655 as described with reference to FIG. 6.

At 1135, the method may include causing display of an indication of a progress of recovering the data from the data backup environment to the data source environment. The operations of 1135 may be performed in accordance with examples as disclosed herein. In some examples, aspects of the operations of 1135 may be performed by a progress component 645 as described with reference to FIG. 6.

At 1140, the method may include initiating recovery of data for remaining users associated with the data upon completion of the recovery of data for the subset of users. The operations of 1140 may be performed in accordance with examples as disclosed herein. In some examples, aspects of the operations of 1140 may be performed by a recovery component 655 as described with reference to FIG. 6.

A method for data recovery is described. The method may include receiving an input indicating a recovery priority for recovering data from a data backup environment to a data source environment, receiving data usage statistics indicating data access metrics and user access metrics corresponding to the data in the data source environment, generating, from the recovery priority and the data usage statistics, one or more data priority classifications for the data, building a data model indicating an order for recovery of the data based on the one or more data priority classifications, and causing display of an indication of a progress of recovering the data from the data backup environment to the data source environment.

An apparatus for data recovery is described. The apparatus may include a processor, memory coupled with the processor, and instructions stored in the memory. The instructions may be executable by the processor to cause the apparatus to receive an input indicating a recovery priority for recovering data from a data backup environment to a data source environment, receive data usage statistics indicating data access metrics and user access metrics corresponding to the data in the data source environment, generate, from the recovery priority and the data usage statistics, one or more data priority classifications for the data, build a data model indicating an order for recovery of the data based on the one or more data priority classifications, and cause display of an indication of a progress of recovering the data from the data backup environment to the data source environment.

Another apparatus for data recovery is described. The apparatus may include means for receiving an input indicating a recovery priority for recovering data from a data backup environment to a data source environment, means for receiving data usage statistics indicating data access metrics and user access metrics corresponding to the data in the data source environment, means for generating, from the recovery priority and the data usage statistics, one or more data priority classifications for the data, means for building a data model indicating an order for recovery of the data based on the one or more data priority classifications, and means for causing display of an indication of a progress of recovering the data from the data backup environment to the data source environment.

A non-transitory computer-readable medium storing code for data recovery is described. The code may include instructions executable by a processor to receive an input indicating a recovery priority for recovering data from a data backup environment to a data source environment, receive data usage statistics indicating data access metrics and user access metrics corresponding to the data in the data source environment, generate, from the recovery priority and the data usage statistics, one or more data priority classifications for the data, build a data model indicating an order for recovery of the data based on the one or more data priority classifications, and cause display of an indication of a progress of recovering the data from the data backup environment to the data source environment.

Some examples of the method, apparatuses, and non-transitory computer-readable medium described herein may further include operations, features, means, or instructions for performing an extraction of a first set of data usage statistics indicating the data access metrics and the user access metrics and receiving a second set of data usage statistics associated with past data recovery from the data backup environment to the data source environment, where building the data model may be further based on the first set of data usage statistics and the second set of data usage statistics.

Some examples of the method, apparatuses, and non-transitory computer-readable medium described herein may further include operations, features, means, or instructions for identifying, based on the user access metrics, a first set of users having a first priority level and a second set of users having a second priority level and recovering data corresponding to the first set of users having the first priority level prior to recovering data corresponding to the second set of users having the second priority level.

Some examples of the method, apparatuses, and non-transitory computer-readable medium described herein may further include operations, features, means, or instructions for receiving statistics associated with one or more workflows, where building the data model may be based on the statistics associated with the one or more workflows.

Some examples of the method, apparatuses, and non-transitory computer-readable medium described herein may further include operations, features, means, or instructions for receiving a request to recover data from the data backup environment to the data source environment, identifying a set of workflows associated with the data and a set of users associated with each workflow, the set of users having a set of recovery priorities, and recovering the data from the data backup environment to the data source environment in accordance with identifying the set of workflows.

Some examples of the method, apparatuses, and non-transitory computer-readable medium described herein may further include operations, features, means, or instructions for receiving a request to recover the data from the data backup environment to the data source environment, initiating recovery of data for a subset of users associated with the data in accordance with the order for recovery of the data, and initiating recovery of data for remaining users associated with the data upon completion of the recovery of data for the subset of users.

In some examples of the method, apparatuses, and non-transitory computer-readable medium described herein, the data may be operational upon completion of the recovery of data for the subset of users. In some examples of the method, apparatuses, and non-transitory computer-readable medium described herein, the data usage statistics include at least one of a nature of data, a type of the data, data relevancy, data recency, data workflow, data generation, data consumption, or a combination thereof.

In some examples of the method, apparatuses, and non-transitory computer-readable medium described herein, the display of the indication of progress of recovering the data from the data backup environment may be displayed in accordance with the order for recovery of the data.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data recovery, comprising:
receiving an input indicating a recovery priority for recovering data from a data backup environment to a data source environment;
generating, from the recovery priority and data usage statistics, one or more data priority classifications for the data;
performing an extraction of a first set of data usage statistics indicating data access metrics and user access metrics;
receiving a second set of data usage statistics associated with past data recovery from the data backup environment to the data source environment;
building a data model indicating an order for recovery of the data based at least in part on the first set of data usage statistics and the second set of data usage statistics; and
causing display of an indication of a progress of recovering the data from the data backup environment to the data source environment.

2. The method of claim 1, further comprising:
identifying, based at least in part on the user access metrics, a first set of users having a first priority level and a second set of users having a second priority level; and
recovering data corresponding to the first set of users having the first priority level prior to recovering data corresponding to the second set of users having the second priority level.

3. The method of claim 1, further comprising:
receiving statistics associated with one or more workflows, wherein building the data model is based at least in part on the statistics associated with the one or more workflows.

4. The method of claim 1, further comprising:
receiving a request to recover data from the data backup environment to the data source environment;
identifying a set of workflows associated with the data and a set of users associated with each workflow, the set of users having a set of recovery priorities; and
recovering the data from the data backup environment to the data source environment in accordance with identifying the set of workflows.

5. The method of claim 1, further comprising:
receiving a request to recover the data from the data backup environment to the data source environment;
initiating recovery of data for a subset of users associated with the data in accordance with the order for recovery of the data; and initiating recovery of data for remaining users associated with the data upon completion of the recovery of data for the subset of users.

6. The method of claim 5, wherein the data is operational upon completion of the recovery of data for the subset of users.

7. The method of claim 1, wherein the data usage statistics comprise at least one of a nature of data, a type of the data, data relevancy, data recency, data workflow, data generation, data consumption, or a combination thereof.

8. The method of claim 1, wherein the display of the indication of progress of recovering the data from the data backup environment is displayed in accordance with the order for recovery of the data.

9. The method of claim 1, wherein building the data model further comprises:
building the data model based at least in part on the one or more data priority classifications.

10. An apparatus for data recovery, comprising:
a processor;
memory coupled with the processor; and
instructions stored in the memory and executable by the processor to cause the apparatus to:
receive an input indicating a recovery priority for recovering data from a data backup environment to a data source environment;
generate, from the recovery priority and data usage statistics, one or more data priority classifications for the data;
perform an extraction of a first set of data usage statistics indicating data access metrics and user access metrics;
receive a second set of data usage statistics associated with past data recovery from the data backup environment to the data source environment;
build a data model indicating an order for recovery of the data based at least in part on the first set of data usage statistics and the second set of data usage statistics; and
cause display of an indication of a progress of recovering the data from the data backup environment to the data source environment.

11. The apparatus of claim 10, wherein the instructions are further executable by the processor to cause the apparatus to:
identify, based at least in part on the user access metrics, a first set of users having a first priority level and a second set of users having a second priority level; and
recover data corresponding to the first set of users having the first priority level prior to recovering data corresponding to the second set of users having the second priority level.

12. The apparatus of claim 10, wherein the instructions are further executable by the processor to cause the apparatus to:
receive statistics associated with one or more workflows, wherein building the data model is based at least in part on the statistics associated with the one or more workflows.

13. The apparatus of claim 10, wherein the instructions are further executable by the processor to cause the apparatus to:
receive a request to recover data from the data backup environment to the data source environment;
identify a set of workflows associated with the data and a set of users associated with each workflow, the set of users having a set of recovery priorities; and
recover the data from the data backup environment to the data source environment in accordance with identifying the set of workflows.

14. The apparatus of claim 10, wherein the instructions are further executable by the processor to cause the apparatus to:
receive a request to recover the data from the data backup environment to the data source environment;
initiate recovery of data for a subset of users associated with the data in accordance with the order for recovery of the data; and
initiate recovery of data for remaining users associated with the data upon completion of the recovery of data for the subset of users.

15. The apparatus of claim 14, wherein the data is operational upon completion of the recovery of data for the subset of users.

16. The apparatus of claim 10, wherein the data usage statistics comprise at least one of a nature of data, a type of the data, data relevancy, data recency, data workflow, data generation, data consumption, or a combination thereof.

17. The apparatus of claim 10, wherein the display of the indication of progress of recovering the data from the data backup environment is displayed in accordance with the order for recovery of the data.

18. The apparatus of claim 10, wherein the instructions to build the data model are further executable by the processor to cause the apparatus to:
build the data model based at least in part on the one or more data priority classifications.

19. A non-transitory computer-readable medium storing code for data recovery, the code comprising instructions executable by a processor to:
receive an input indicating a recovery priority for recovering data from a data backup environment to a data source environment;
generate, from the recovery priority and data usage statistics, one or more data priority classifications for the data;
perform an extraction of a first set of data usage statistics indicating data access metrics and user access metrics;
receive a second set of data usage statistics associated with past data recovery from the data backup environment to the data source environment;
build a data model indicating an order for recovery of the data based at least in part on the first set of data usage statistics and the second set of data usage statistics; and
cause display of an indication of a progress of recovering the data from the data backup environment to the data source environment.

20. The non-transitory computer-readable medium of claim 19, wherein the instructions to build the data model are further executable by the processor to:
build the data model based at least in part on the one or more data priority classifications.

* * * * *